Oct. 6, 1959  F. C. TRAUTVETTER  2,907,134
SAFETY APPLIANCE AND RELEASE FOR FISHING TACKLE OR FISHHOOKS
Filed March 6, 1958
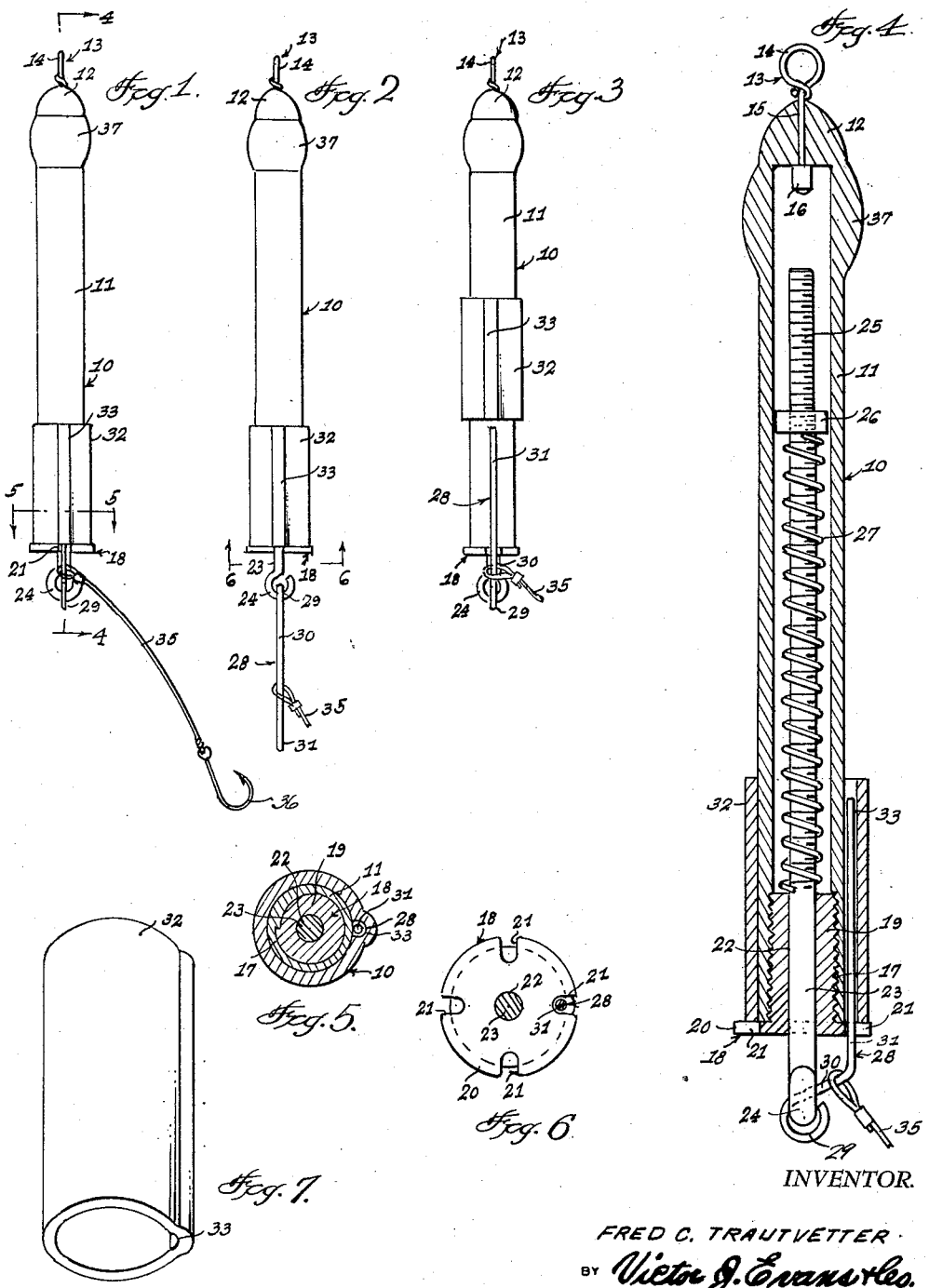
INVENTOR.
FRED C. TRAUTVETTER
BY Victor J. Evans & Co.
ATTORNEYS

United States Patent Office 2,907,134
Patented Oct. 6, 1959

2,907,134

SAFETY APPLIANCE AND RELEASE FOR FISHING TACKLE OR FISHHOOKS

Fred C. Trautvetter, Warsaw, Ill.

Application March 6, 1958, Serial No. 719,531

1 Claim. (Cl. 43—43.12)

This invention relates to fishing equipment, and more particularly to a release for fishing tackle whereby in the event that the fishhook becomes snagged or caught on a rock, the release will permit the fishing line to be retrieved or recovered.

An important object of the present invention is to provide a fishing tackle release which is adapted to have a leader or line connected thereto, and whereby such leader provides a support for a fishhook or fishhooks, so that in the event that the hooks become snagged on a rock or other obstacle, the release will permit the leader to become disconnected so that the main fishing line can be reeled in and wherein there will be no loss of expensive or valuable equipment even though the fishhook becomes snagged on a rock or the like.

Another object of the invention is to provide a fishing tackle release mechanism which includes a spring operated barrel that will serve to release the fishhook when sufficient pressure is applied to the fishing line so that snagged hooks can be released from the main fishing line whereby the main fishing line together with various accessories thereon can be reeled in or recovered, so that loss of valuable equipment is minimized or prevented.

A further object of the invention is to provide a fishing tackle safety release mechanism which is extremely simple and inexpensive to manufacture.

Other objects and advantages will be apparent during the course of the following description.

In the accompanying drawings, forming a part of this application, and in which like numerals are used to designate like parts throughout the same:

Figure 1 is an elevational view illustrating the release device of the present invention, and showing the parts in normal position as when a hook is not snagged on a rock or the like or in weeds or the like.

Figure 2 is a view similar to Figure 1, but showing the finger or trigger released so as to permit the leader to become disconnected from the device, as for example when a rock or the like is snagged or hooked.

Figure 3 is an elevational view illustrating the method of attaching a new leader to the device.

Figure 4 is an enlarged sectional view taken on the line 4—4 of Figure 1.

Figure 5 is a sectional view taken on the line 5—5 of Figure 1.

Figure 6 is a sectional view taken on the line 6—6 of Figure 2.

Figure 7 is a perspective view of the movable sleeve.

Referring in detail to the drawings, the numeral 10 indicates the fishing accessory of the present invention which is shown to comprise a barrel or housing 11 that has its upper end closed as at 12, while the other end or lower end of the barrel 11 is open. The numeral 13 indicates a support member which includes a shank portion 15 that extends through the end 12 of the barrel 11, and an eyelet 14 is arranged on the upper end of the shank portion 15, the eyelet 14 adapted to be connected to a fishing line which extends from a fishing rod, pole or the like. Arranged on the inner end of the shank 15 is an enlargement 16, and the support member 13 is in the nature of a swivel connection between the fishing line and barrel 11.

The lower interior portion of the housing 11 is threaded as at 17, and the numeral 18 indicates a body member which is provided with a cylindrical threaded bushing 19 that threadedly engages the portion 17 of the housing 11. The outer end of the body member 18 is shaped to provide a circular flange 20 which has a plurality of slots 21 arranged therein as shown in Figure 6.

As shown in the drawings, the body member 18 is provided with a central bore 22, and the numeral 23 indicates a rod which slidably projects through the bore 22. The rod 23 has an eyelet 24 on its lower end, and the major portion of the rod 23 is threaded as at 25. The numeral 26 indicates a securing element or nut which is adjustably mounted on the threaded portion 25 of the rod 23, and a coil spring 27 is arranged on the rod 23, the coil spring 27 being positioned between the nut 26 and the inner end of the bushing 19.

The numeral 28 indicates a finger or trigger which is provided with a coiled portion 29 that is connected to the eyelet 24 of the rod 23. The finger 28 further includes a first portion 30 which extends from the coiled portion 29, and arranged angularly with respect to the first portion 30 is a second portion 31. The numeral 32 indicates a sleeve which is movably mounted on the barrel 11, and the sleeve 30 is provided with a longitudinally extending channel or groove 33 that is adapted to receive therein the portion 31 of the finger 28, when the parts are in the position shown in Figure 1 or Figure 4. The numeral 35 indicates a leader which is connected to the finger 28, and the leader 35 provides a support for a fishhook such as the hook 36.

As indicated by the numeral 37, there is provided on the upper portion of the barrel 11 an enlargement 37 which defines an annular shoulder that serves to prevent the sleeve 32 from becoming entirely separated from the upper end of the barrel 11.

From the foregoing, it is apparent that there has been provided a safety release device for use with fishing tackle so that in the event that a hook such as the hook 36 becomes snagged on a rock, weeds or the like, then the release mechanism will permit the snagged hook to come loose from the main fishing line so that the main fishing line together with the accessories thereon can be recovered whereby loss of valuable or expensive equipment is prevented. Normally, the parts are in the position shown in Figure 1 or Figure 4 so that the main fishing line is connected to the eyelet 14 on the support member 13. The leader 35 which supports the fishhook 36, is arranged in engagement with the finger 28, and the finger 28 has its portion 31 received in the channel 33 of the sleeve 32, the sleeve 32 being in lowered position on the barrel 11. Thus, when a fish strikes the hook 36, the line can be reeled in in the usual manner so that the fish on the hook 36 can be recovered in the conventional manner. However, in the event that the hook 36 strikes a rock or becomes snagged on any other object, then with the fishing line attached to the eyelet 14, it will be seen that as the person pulls in the fishing line, the coil spring 27 will be compressed so that there will be relative movement between the barrel 11 and rod 23 whereby the portion 31 of the finger 28 will be able to move clear of the sleeve 32 so that the parts can move from the position shown in Figures 1 and 4 to the position shown in Figure 2. Then, the swivel connection between the portions 29 and 24 permits the finger 28 to move free of the slot 21 and also move free of the channel 33 so that the leader 35 can readily slide off of the finger 28. Then, the fishing line can be reeled in and the only part of the device that will be lost will be the leader 35 with the hook 36 thereon.

When it is desired to replace the lost leader, then the sleeve 32 can be readily moved from the position shown in Figure 2, to the position shown in Figure 3, that is the sleeve 32 can be slid or moved along the barrel 11 and then the leader 35 is arranged in engagement with the finger 28, and then the finger 28 is moved to the position shown in Figure 3 so that the finger 28 has a portion thereof projecting through one of the slots 21 in the flange 20. Then, the sleeve 32 is moved downwardly from the position shown in Figure 3 to the position shown in Figures 1 and 4 so that the channel 33 will receive the portion 31 of the finger 28 whereby the finger will be locked in position so that the leader 35 cannot accidentally come loose from the finger or trigger. Then, the equipment is ready to be used in the normal manner.

The enlargement 37 insures that the sleeve 32 will not accidentally come off of the upper end of the barrel 11, and the body member 18 has the bushing 19 which threadedly engages the portion 17 of the barrel 11. The rod 23 slidably projects through the bore 22 in the body member 18.

The parts can be made of any suitable material and in different shapes or sizes.

By adjusting the position of the nut 26 on the rod 23, the tension on the spring 27 can be varied as desired. While the device will release the fishhook when a rock is snagged, nevertheless when a fish is caught, there will not be sufficient pressure to cause the fishhook to release.

Minor changes in shape, size and rearrangement of details coming within the field of invention claimed may be resorted to in actual practice, if desired.

I claim:

In a fishing accessory, a barrel having a closed upper end and an open lower end, the interior of said barrel being hollow, a support member connected to the upper end of said barrel and including a shank portion having an eye on its upper end and an enlargement on its inner end, an inner portion of said barrel being threaded adjacent the lower open end thereof, a body member including a cylindrical threaded bushing threadedly engaging the threaded inner portion of the barrel, said body member further including a circular flange provided with a plurality of spaced apart radially extending slots therein, there being a central bore in said body member, a rod extending through said bore and having an eyelet on its lower outer end, the major portion of said rod being threaded, a securing element adjustably mounted on the threaded portion of said rod, a coil spring arranged on said rod and interposed between said securing element and said bushing, a finger having a coiled portion connected to the eyelet on the rod, a first portion extending from said coiled portion and terminating in an angularly arranged second portion for projecting through one of the slots in said flange, and a movable sleeve mounted on the barrel and provided with a longitudinally extending channel in the interior surface thereof for receiving the second portion of said finger.

References Cited in the file of this patent

UNITED STATES PATENTS

| | | |
|---|---|---|
| 704,265 | McMaster | July 8, 1902 |
| 1,179,590 | Whitcomb | Apr. 18, 1916 |
| 2,627,692 | Goodman | Feb. 10, 1953 |
| 2,733,537 | Elsberg | Feb. 7, 1956 |